(12) United States Patent
Soudier

(10) Patent No.: US 9,476,646 B2
(45) Date of Patent: Oct. 25, 2016

(54) CASTABLE REFRACTORY COMPOSITION

(75) Inventor: Jerome Soudier, Vaux en Bugey (FR)

(73) Assignee: Calderys France, Issy-les-Moulineaux (FR)

( * ) Notice: Subject to any disclaimer, the term of this patent is extended or adjusted under 35 U.S.C. 154(b) by 119 days.

(21) Appl. No.: 14/241,932

(22) PCT Filed: Aug. 30, 2012

(86) PCT No.: PCT/EP2012/066902
§ 371 (c)(1),
(2), (4) Date: May 5, 2014

(87) PCT Pub. No.: WO2013/030301
PCT Pub. Date: Mar. 7, 2013

(65) Prior Publication Data
US 2014/0291904 A1    Oct. 2, 2014

(30) Foreign Application Priority Data

Sep. 2, 2011   (EP) .................................... 11290390

(51) Int. Cl.
| | | |
|---|---|---|
| *C04B 35/101* | (2006.01) | |
| *C04B 35/567* | (2006.01) | |
| *F27D 1/00* | (2006.01) | |
| *C04B 35/103* | (2006.01) | |
| *C04B 35/18* | (2006.01) | |
| *C04B 35/565* | (2006.01) | |
| *C04B 35/66* | (2006.01) | |
| *C04B 35/01* | (2006.01) | |
| *C04B 35/626* | (2006.01) | |
| *C04B 35/63* | (2006.01) | |
| *C04B 35/632* | (2006.01) | |
| *C04B 35/634* | (2006.01) | |
| *C04B 35/80* | (2006.01) | |
| *F27D 1/16* | (2006.01) | |

(52) U.S. Cl.
CPC ........... *F27D 1/0003* (2013.01); *C04B 35/013* (2013.01); *C04B 35/103* (2013.01); *C04B 35/18* (2013.01); *C04B 35/565* (2013.01); *C04B 35/6263* (2013.01); *C04B 35/62665* (2013.01); *C04B 35/632* (2013.01); *C04B 35/6303* (2013.01); *C04B 35/634* (2013.01); *C04B 35/6316* (2013.01); *C04B 35/6348* (2013.01); *C04B 35/63404* (2013.01); *C04B 35/63424* (2013.01); *C04B 35/66* (2013.01); *C04B 35/80* (2013.01); *F27D 1/16* (2013.01); *C04B 2235/3201* (2013.01); *C04B 2235/3205* (2013.01); *C04B 2235/3206* (2013.01); *C04B 2235/3208* (2013.01); *C04B 2235/3215* (2013.01); *C04B 2235/3217* (2013.01); *C04B 2235/3222* (2013.01); *C04B 2235/349* (2013.01); *C04B 2235/3418* (2013.01); *C04B 2235/3454* (2013.01); *C04B 2235/3463* (2013.01); *C04B 2235/3817* (2013.01); *C04B 2235/3821* (2013.01); *C04B 2235/3826* (2013.01); *C04B 2235/3839* (2013.01); *C04B 2235/3865* (2013.01); *C04B 2235/3869* (2013.01); *C04B 2235/40* (2013.01); *C04B 2235/401* (2013.01); *C04B 2235/402* (2013.01); *C04B 2235/404* (2013.01); *C04B 2235/405* (2013.01); *C04B 2235/408* (2013.01); *C04B 2235/422* (2013.01); *C04B 2235/424* (2013.01); *C04B 2235/425* (2013.01); *C04B 2235/428* (2013.01); *C04B 2235/447* (2013.01); *C04B 2235/48* (2013.01); *C04B 2235/5212* (2013.01); *C04B 2235/5409* (2013.01); *C04B 2235/5427* (2013.01); *C04B 2235/5436* (2013.01); *C04B 2235/61* (2013.01); *C04B 2235/72* (2013.01)

(58) Field of Classification Search
CPC . C04B 35/11; C04B 35/1015; C04B 35/103; C04B 35/18; C04B 35/66
See application file for complete search history.

(56) References Cited

U.S. PATENT DOCUMENTS

| | | | | |
|---|---|---|---|---|
| 5,422,323 | A * | 6/1995 | Banerjee | ............. C04B 35/6316 266/280 |
| 5,856,251 | A | 1/1999 | Teranishi et al. | |
| 5,932,506 | A | 8/1999 | Bogan | |
| 2010/0009840 | A1* | 1/2010 | Pattillo | ................. C22C 29/005 501/103 |
| 2012/0142518 | A1* | 6/2012 | Pattillo | ................. C04B 35/013 501/89 |

FOREIGN PATENT DOCUMENTS

| | | |
|---|---|---|
| FR | 2 757 503 A1 | 6/1998 |
| FR | 2 798 091 A1 | 3/2001 |
| FR | 2 798 092 A1 | 3/2001 |
| WO | WO 2013/030301 A1 | 3/2013 |

OTHER PUBLICATIONS

International Search Report and Written Opinion issued Oct. 9, 2012, in International Application No. PCT/EP2012/066902.

* cited by examiner

*Primary Examiner* — Karl Group
(74) *Attorney, Agent, or Firm* — Finnegan, Henderson, Farabow, Garrett & Dunner LLP

(57) ABSTRACT

A castable refractory composition may include from 5% to 95% by weight of alumina, aluminosilicate, or mixtures thereof; up to 70% by weight silicon carbide; up to 10% by weight carbon; from 0.1% to 5% by weight alkaline earth metal oxide and/or hydroxide; and from 0.1% to 5% by weight of silica having a surface area of at least about 10 $m^2/g$. The refractory composition may further include no more than 0.5% by weight of cementitious binder, and the refractory composition may not release a significant amount of hydrogen gas upon addition of water. The refractory composition may set on addition of water. An installable refractory lining may be formed using the composition and a method including at least one of casting, self-flowing, wet shotcreting, rodding, cast-vibrating, spraying, conventional dry gunning, or high density gunning the castable refractory composition, and setting and drying the composition.

20 Claims, 2 Drawing Sheets

CASTABLE REFRACTORY COMPOSITION

CLAIM FOR PRIORITY

This application is a U.S. national phase entry under 35 U.S.C. §371 from PCT International Application No. PCT/EP2012/066902, filed Aug. 30, 2012, which claims the benefit of priority of European Patent Application No. 11290390.1, filed Sep. 2, 2011, the subject matter of both of which is incorporated herein by reference.

TECHNICAL FIELD

The present invention is directed to a castable refractory composition, to refractory linings and articles formed therefrom and to methods of installing a refractory from said castable refractory composition.

BACKGROUND OF THE INVENTION

Refractories are materials having properties that make them suitable for use as heat-resistant barriers in high temperature applications. Unshaped refractory materials have the ability to form a joint-less lining, and are often referred to as monolithic. These materials are useful for example as lining for cupolas hearth and siphon, blast furnaces, main, secondary and tilting runners, and more generally vessels or vessel spouts, ladles, tundishes, reaction chambers and troughs that contain, direct the flow or are suitable to facilitate the industrial treatment of liquid metals and slags, or any other high temperature liquids, solids or gases. Unshaped refractories are typically manufactured in powdered form and mixed with water prior to application. The wet material may be applied as a lining using techniques such as casting, spraying and gunning followed by setting and drying, prior to firing.

An important aspect of any refractory material is its ability to be dried out safely and quickly after setting. As such, the wet material should have a high permeability to gas and especially water vapour during dry-out on heating. Typically, therefore, some refractory materials, in particular those dedicated to thick and high thermal conductive linings (as for example carbon and/or SiC containing monolithics) or applications that call for very fast lining commissioning or installation in hot (i.e., 100-800° C.) conditions, are prepared using components which evolve inflammable hydrogen gas during wetting and setting which produces pores, voids and micro-cracking, which in turn increases permeability to gas, and thus enables quick water dry-out during heating. Typically, refractories are prepared including reactive metallic components which hydrolyse in the presence of water and under specific pH to yield hydrogen gas.

However, the emission of hydrogen gas is a safety concern since there is a risk of accidental explosion of emitted hydrogen during setting when mixed with oxygen from air in the presence of an ignition source. It would therefore be desirable to be able to prepare refractory materials which do not evolve hydrogen on setting.

However, owing to the absence of hydrogen and the expected concomitant decrease in permeability to gas, there is a risk that any improvement in safety could be off-set by a reduction in the capability of the refractory lining to be dried out and heated up to service temperature in a short time, or a detrimental effect on the ability to install the refractory under hot conditions on hot substrates. For example, with a reduction in pores and voids through which water vapour would escape during dry-out, there is an increased risk of explosion resulting from water vapour pressure generation inside the lining during dry-out.

There is therefore a need for further castable refractory materials which do not emit significant amounts of hydrogen on setting and which have chemical, physical, mineralogical, thermal, commissioning and/or installation properties at least as good, or even improved compared to, conventional hydrogen emitting refractory materials. For example, commissioning should be easy and rapid, and installation should be as straight forward as possible and not call for increased complexity such as requiring the use of special liquids as colloidal suspensions, or other chemicals, such as phosphoric acids, phosphate solutions, sodium silicate and organic compounds suitable for polymerization, for wet mixing.

SUMMARY OF THE INVENTION

In accordance with a first aspect, there is provided a castable refractory composition comprising:
  5% to 95% by weight of alumina, aluminosilicate, or mixtures thereof;
  optionally up to 70% by weight silicon carbide,
  optionally up to 10% by weight carbon,
  0.1% to 5% by weight alkaline earth metal oxide and/or hydroxide, and
  0.1% to 5% by weight of silica having a surface area of at least about 10 $m^2/g$;
  wherein the refractory composition includes no more than about 0.5% by weight of cementitious binder;
  wherein the refractory composition does not release a significant amount of hydrogen gas upon addition of water; and
  wherein the refractory composition sets on addition of water In accordance with a second aspect, there is provided an installable refractory lining obtained by mixing the castable refractory composition of the first aspect with 2% to 40% by weight water.

In accordance with a third aspect, there is provided a method of installing the installable refractory lining of the second aspect of the present invention using a technique selected from casting, self flowing, shotcreeting, rodding, cast-vibrating, spraying, conventional dry gunning or high density gunning, followed by setting and drying.

In accordance with a fourth aspect, there is provided an installed refractory lining obtainable by the method of the third aspect. The lining may be a lining for cupolas hearth and siphon, blast furnaces, main, secondary and tilting runners, vessels or vessel spouts, ladles, tundishes, reaction chambers and troughs that contain, direct the flow or are suitable to facilitate the industrial treatment of liquid metals and slags, or any other high temperature liquids, solids or gases.

In accordance with a fifth aspect, there is provided a method of installing a refractory comprising: mixing the castable refractory composition according to first aspect of the invention with water, forming the mixture into an article, allowing the article to set, and drying the article to remove excess water.

In accordance with a sixth aspect, there is provided a refractory article obtainable by the method of the fifth aspect of the present invention.

The present invention relates to a mixture suitable for use as a refractory, for example, as lining for cupolas hearth and siphon, blast furnaces, main, secondary and tilting runners, and more generally vessels or vessel spouts, ladles, tundishes, reaction chambers and troughs that contain, direct the flow or are suitable to facilitate the industrial treatment of liquid metals and slags, or any other high temperature liquids, solids or gases. The mixture can also be used for manufacturing pre-shaped articles, in whole or part, for example, refractory bricks and crucibles. The mixture is characterized, in part, by the absence of significant gas emission and in particular inflammable hydrogen gas during its preparation, mixing with water, installation and setting, which makes it particularly suitable for improving safety of industrial hardware where in the refractory is installed and used. In particular, the castable refractory composition of the present invention suppresses or prevents the reaction of metal particles, such as aluminium, via hydrolysis by the appropriate selection or omission of metallic or mineral additives. In spite of the absence of gas and in particular hydrogen emission, the resulting refractory can be installed on hot substrates, and undergo quick and safe dry-out and heating. The refractory is characterized, in part, by a high permeability to gas and water vapour during dry-out, a high ratio of free water and a low ratio of water of hydration remaining after setting, and high mechanical strength after setting. The combination of such properties suppresses or prevents the formation of cracks, spalling or lining explosion during dry-out and heating up to service temperature. Thus, linings formed from the castable refractory composition can be successfully used in installations normally calling for the use of hydrogen emitting refractories or refractories installed after mixing with colloidal suspensions or other chemicals such as phosphoric acid or phosphate solutions, in order to fit with any installation calling for short commissioning time and safe dry-out.

DETAILED DESCRIPTON

Figure 1:
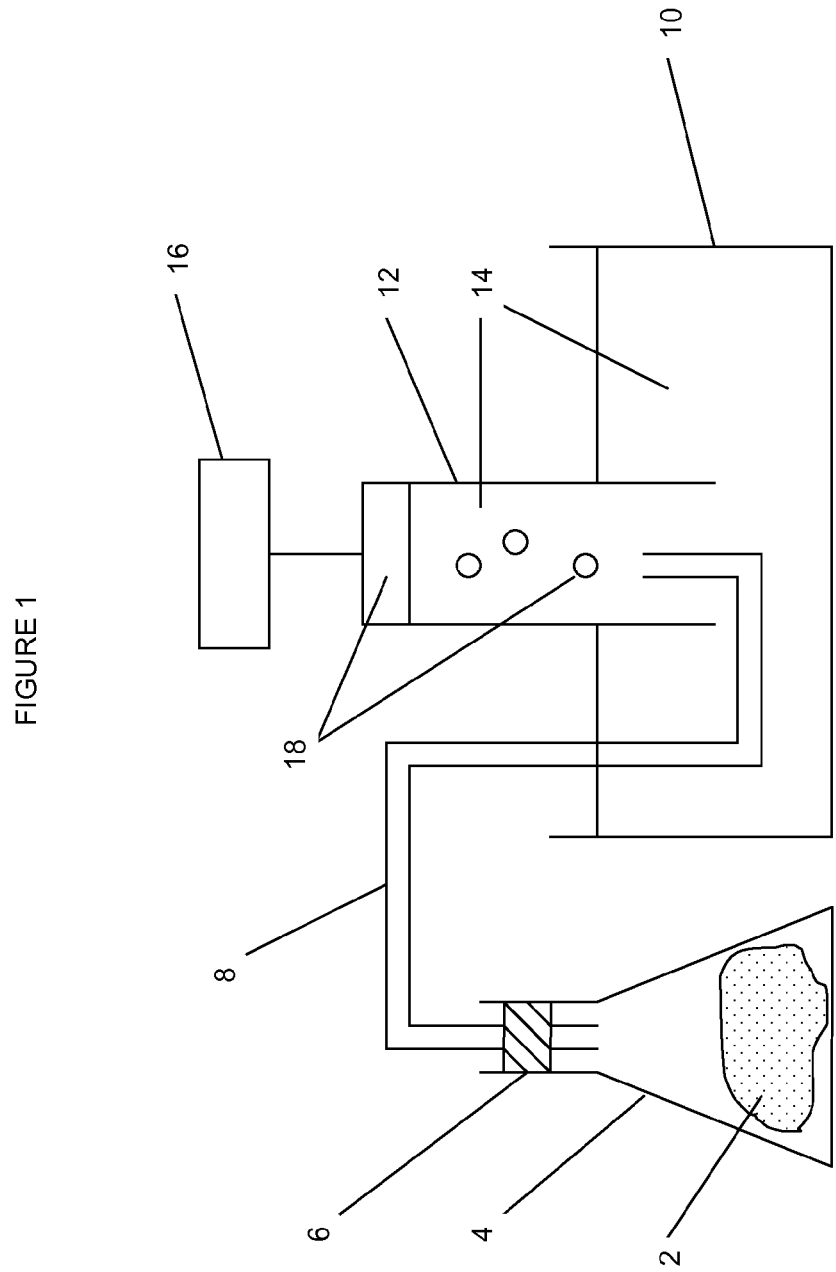
FIG. 1 is a schematic depiction of the measurement procedure for measuring evolution of hydrogen gas from a wetted castable refractory composition.

In accordance with first aspect stated above, there is provided a castable refractory composition. By castable is meant the refractory composition is formable into a jointless or unshaped product upon addition of water, setting and drying to remove excess water.

The castable refractory composition comprises about 5-95% by weight of alumina, aluminosilicate, or mixtures thereof, based on the total dry weight of the castable refractory composition. In an embodiment, the castable refractory composition comprises about 30-95% by weight, for example about, for example about 30-80% by weight, for example about 30-70% by weight, for example about 40-70% by weight, for example about 50-70% by weight, for example about 60-70% by weight of alumina or, for example about 50-60% by weight of alumina, aluminosilicate, or mixtures thereof.

The alumina, aluminosilicate or mixtures thereof may comprise a material selected from brown fused alumina, sintered alumina, white fused alumina, calcined alumina, reactive or semi-reactive alumina, bauxite, fused or sintered mullite, andalusite and calcined chamotte having an alumina content of about 30 to 75% by weight.

The alumina, aluminosilicate or mixtures thereof may comprise, consist essentially of, or consist of particles up to about 30 mm in size, as determined by an appropriately sized sieve. In embodiments, the alumina, aluminosilicate or mixtures thereof comprises, consists essentially of, or consists of particles up to about 10 mm, or up to about 6 mm, or up to about 4 mm, or up to about 2 mm, or up to about 1 mm in size.

In embodiments in which the castable refractory composition comprises up to about 15% by weight calcined alumina, based on the total dry weight of the castable refractory composition, the calcined alumina may comprise particles having a $d_{50}$ of up to about 100 µm, for example, up to about 50 µm, or for example, between about 1 to about 10 µm. Calcined alumina may be included as a component to adjust or enhance the flow characteristics of the castable once mixed with water. It may also be included to control and adjust the particle size distribution of the entire mix.

Unless otherwise stated, the mean (average) equivalent particle diameter ($d_{50}$ value) referred to herein is as measured in a well known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The mean particle size $d_{50}$ is the value determined in this way of the particle esd at which there are 50% by weight of the particles which have an equivalent spherical diameter less than that $d_{50}$ value.

In embodiments in which the castable refractory composition comprises up to about 15% by weight reactive or semi reactive alumina, based on the total dry weight of the castable refractory composition, the reactive or semi reactive may comprise particles having a maximum particle size of up to about 50 µm, for example, up to about 25 µm or for example, a $d_{50}$ between about 0.5 to 5 µm. Reactive or semi reactive alumina may be included as a component to adjust or enhance the flow characteristics of the castable once mixed with water. It may also be included to control and adjust the particle size distribution of the entire mix.

Advantageously, the castable refractory composition may comprise up to about 70% by weight silicon carbide, for example about 5-70% by weight silicon carbide, based on the total dry weight of the castable refractory composition. In an embodiment, the castable refractory composition comprises about 10-50% by weight, for example about 10-40% by weight, for example about 15-40% by weight, for example about 20-40%, for example about 20-30% by weight silicon carbide.

The silicon carbide may comprise, consist essentially of, or consist of particles up to about 30 mm in size, as determined by an appropriately sized sieve. In embodiments, the silicon carbide comprises, consists essentially of, or consists of particles up to about 10 mm, or up to about 8 mm, or up to about 6 mm, or up to about 4 mm, or up to about 2 mm, or up to about 1 mm, or up to about 0.5 mm, or up to about 0.2 mm in size. In other embodiments, the silicon carbide comprises, consists essentially of, or consists of particles having a $d_{50}$ up to about 300 µm. The silicon carbide may comprise, consist essentially of, or consist of particles having a $d_{50}$ of up to about 200 µm, for example, up to about 100 µm or, for example, a $d_{50}$ of up to about 60 µm.

Advantageously, the castable refractory composition may comprise up to about 10% by weight, for example, about 1-10% by weight carbon, based on the total dry weight of the castable refractory composition. In an embodiment, the castable refractory composition comprises about 1-5% by weight, for example about 1-4% by weight, for example about 2-3% by weight carbon. The carbon may comprise a material selected from carbon black, graphite, coke, solid hydrocarbon having a carbon residue of at least about 5% by weight after coking or a combination thereof. In an embodiment, the carbon comprises a mixture of graphite and carbon black.

The graphite may be mono-crystalline or polycrystalline (also known as "amorphous graphite") and may comprise particles of up to about 1 mm in size, as determined by an appropriate sized sieve.

The carbon black may comprise particles having a $d_{50}$ of up to about 100 μm, for example, up to about 75 μm of, for example, up to about 50 μm. The particles of carbon black may have a maximum specific surface area of about 50 $m^2/g$, as determined by nitrogen adsorption using the BET Specific Surface Area measurement method, and a Loss on Ignition (LOI) at 1000° C. of at least 90% by weight.

The coke may comprise particles of up to about 2 mm in size, as determined by an appropriately sized sieve, and a LOI at 1000° C. of at least 80% by weight.

The solid hydrocarbon may have a carbon residue of at least about 10% by weight after coking. It may be in a powdered form comprising particles up to about 2 mm in size, as determined by an appropriately sized sieve, or it may be in the form of a coating of aggregates of 0.5 mm or more. Examples of solid hydrocarbons are bitumens, asphalts, phenolic based resins and synthetic polymers or oligomers.

In an embodiment, the castable refractory composition comprises from about 5 to 70% by weight silicon carbide and from about 1 to 10% by weight carbon. In another embodiment, the castable refractory composition comprises from about 5 to 70% by weight silicon carbide and is substantially free of carbon. In a further embodiment, the castable refractory composition comprises from about 1 to about 10% by weight carbon and is substantially free of silicon carbide.

The castable refractory composition comprises about 0.1-5% by weight alkaline earth metal oxide and/or hydroxide, based on the total dry weight of the castable refractory composition. The alkaline earth metal oxide and/or hydroxide is a component of the binder on addition of water and during setting. In an embodiment, the castable refractory comprises about 0.1-4% by weight alkaline earth metal oxide and/or hydroxide, for example about 0.1-3% by weight alkaline earth metal oxide and/or hydroxide, for example about 0.1-2% by weight alkaline earth metal oxide and/or hydroxide, for example about 0.1-1.5% by weight or, for example, about 0.5-1.5% by weight alkaline earth metal oxide and/or hydroxide. In an embodiment, the alkaline earth metal oxide and/or hydroxide is an oxide and/or hydroxide of magnesium, calcium or barium, or mixtures thereof. In an embodiment, the alkaline earth metal oxide and/or hydroxide is magnesia and/or magnesium hydroxide. In an embodiment, the magnesia comprises, consists essentially of, or consists of partially hydrated magnesium oxide. In another embodiment, the alkaline earth metal oxide and/or hydroxide is calcium hydroxide and/or calcium oxide. In a further embodiment, the alkaline earth metal oxide and/or hydroxide is barium oxide and/or barium hydroxide. The alkaline earth metal oxide and/or hydroxide may comprise, consist essentially or consist of particles having a $d_{50}$ of less than about 100 μm, for example, a $d_{50}$ of less than about 75 μm or, for example, a $d_{50}$ of less than about 50 μm.

The castable refractory composition comprises about 0.1-5% by weight of silica having a surface area of at least about 10 $m^2/g$, as measured by nitrogen adsorption using the BET Specific Surface Area measurement method. In an embodiment, the castable refractory composition comprises about 0.1-4% by weight silica, for example about 0.1-3% by weight silica, for example about 0.5-3% by weight silica or, for example, about 1-3% by weight silica. The silica may have a surface are of at least about 20 $m^2/g$, for example at least about 50, $m^2/g$, for example at least about 100 $m^2/g$ or, for example at least about 200 $m^2/g$. In an embodiment, the surface area of the silica is no more than about 500 $m^2/g$. In embodiment, the silica is selected from the group consisting of fumed silica (also known as pyrogenic silica), silica fume (also known as oxidized silicon vapour), microsilica, micro grinded silica and precipitated silica. The silica having a surface area of at least about 10 $m^2/g$ is a component of the binder, along with the alkaline earth metal oxide or hydroxide and water.

The castable refractory composition includes no more than about 0.5% by weight cementitious binder, for example, no more than about 0.5 wt. % calcium aluminate cement and/or calcium silicate cement. In an embodiment, the castable refractory composition includes no more than about 0.25% by weight cementitious binder, for example, no more than about 0.25% by weight calcium aluminate cement and/or calcium silicate cement. In another embodiment, the castable refractory composition includes no more than about 0.1% by weight cementitious binder, for example, no more than about 0.1% by weight calcium aluminate cement and/or calcium silicate cement. In another embodiment, the castable refractory composition is substantially free of cementitious binder, for example, substantially free of calcium aluminate cement and/or calcium silicate cement.

In accordance with the first aspect, the refractory composition does not release a significant amount of hydrogen gas upon addition of water. By "does not release a significant amount of hydrogen gas upon addition of water" is meant that in accordance with the following measurement procedure, the castable refractory composition directly following mixing with water produces less than 25 $cm^3$ of hydrogen gas per kilogram of wetted castable refractory composition, i.e., hydrogen gas emission is less than about 25 $cm^3$ $H_2$/kg of wetted castable refractory composition, for example, less than about 15 $cm^3$ $H_2$/kg or, for example, less than about 10 $cm^3$ $H_2$/kg of wetted castable refractory composition. In an embodiment, hydrogen emission is not detectable as measured in accordance with the following procedure, described with reference to FIG. 1.

Directly after mixing with the castable refractory composition with water, in accordance with EN 1402, approximately 300 g of the resulting wet product (2) is precisely weighed and placed into a sealable recipient (4). The recipient (4) is sealed with a suitable sealing means (e.g., a rubber stopper) and is connected via a tube (8) to a vessel (10) and column (12) containing water (14). The water column (12, 14) is continuously weighed by suitable weighing means (16). The temperature is 20° C. and the pressure is 1 atm and kept constant during the procedure. If hydrogen gas (18) is emitted, the gas (18) will displace water (14) from the column (12). The weight loss of the water column (12, 14) is used to calculate the cumulative hydrogen gas emission over a period of 72 hours expressed in $cm^3$ of hydrogen gas per kg of wetted castable refractory composition.

The castable refractory composition sets upon addition of an appropriate amount of casting water. The appropriate amount of water will vary depending on the precise composition of the castable refractory composition, its intended use and the method by which the refractory is installed.

In an embodiment, between about 2% and about 40% water is added, based on the total the dry weight of the castable refractory composition. For example, when the refractory is to be installed using a conventional dry gunning technique, between about 10% and 40% by weight of water is added to the castable refractory composition. For example, when the refractory is to be installed using a casting or spray-casting technique, between about 2 and about 8 wt. % water is added to the castable refractory composition. For example, when the refractory is to be installed using a high density gunning technique (as described in FR2798092 and FR2798091), between about 5 and about 20 wt. % water is added to the castable refractory composition.

In embodiments, the castable refractory composition is mixed with about 2-30% by weight of water, for example about 2-20% by weight of water, for example about 12-10% by weight of water for example about 5-30% by weight of water, for example about 10-30% by weight of water, for example about 2-20% by weight of water, for example about 5-20% by weight of water, for example about 10-20% by weight of water, for example about 2-10% by weight of water or, for example about 3-7% by weight of water, based on the total dry weight of the castable refractory composition.

The castable refractory composition may further comprise from about 0.01 to about 3% by weight solid powdered organic additive, for example, from about 0.05 to about 3% by weight or, for example, from about 0.05 to about 2% by weight solid powdered organic additive. These additives may be used as dispersants (e.g., to disperse fine or high specific surface area or hydrophobic components in water and, thus, enable the adjustment of the flow of the castable with minimal water addition) or to adjust the setting time and working time of the castable one mixed with water. The solid powdered additive may be selected from polyacrylates, polyglycols, polyglycolethers, carboxylic ethers, polymelamines, polynaphthalenes, ethers, citric acid, hydrated citric acid, citrates and mixtures thereof.

The castable refractory composition may further comprise from about 0.01 to about 3% by weight solid soluble mineral additive, for example, from about 0.05 to about 3% by weight or, for example, from about 0.05 to about 2% by weight solid soluble additive. These additives may be used as dispersants (e.g., to disperse fine or high specific surface area or hydrophobic components in water and, thus, enable the adjustment of the flow of the castable with minimal water addition) or to adjust the setting time and working time of the castable one mixed with water. The solid powdered additive may be selected from sodium phosphate, sodium aluminate, boric acid, calcium silicate, calcium aluminate and mixtures thereof.

The castable refractory composition may further comprise up to about 5% by weight of metallic additives, based on the total dry weight of the castable refractory composition. Metallic additives include aluminium, silicon, magnesium, iron, chromium, zirconium, their alloys and mixtures thereof. The metallic additive may be in powdered form. In an embodiment, the castable refractory composition comprises less than about 4% by weight, for example less than about 3% by weight, for example less than about 2% by weight, for examples less than about 1% by weight, for example, less than about 0.75% by weight, for example, less than about 0.5% by weight or, for example, less than about 0.25% by weight of metallic additives. As noted below, in one embodiment, the castable refractory composition is substantially free of metallic additives.

Additives may be included in the castable refractory composition to suppress or prevent oxidation of carbon. Thus, in an embodiment, the castable refractory composition may comprise up to about 5% by weight of an additive or additives which suppress or prevent oxidation of carbon, based on the total dry weight of the castable refractory composition. In an embodiment, the additive is selected from the group consisting of aluminium nitride, aluminium oxy-nitride, boron carbide, zirconium carbide, calcium carbide, metals that include aluminium, silicon, magnesium, iron, chromium, zirconium their alloys, and mixtures thereof. In an embodiment, the additive or additives which suppress or prevent oxidation of carbon is not metallic. In another embodiment, the castable refractory composition comprises no more than about 4% of said additive or additives, for example, no more than about 3% by weight of said additive or additives, for example, no more than about 2% by weight of said additive or additives or, for example, no more than about 1% by weight of said additive or additives.

If metallic additives are included which are sufficiently reactive to generate a hydrolysis reaction upon addition of water, evolution of hydrogen gas may be suppressed or prevented by preventing direct contact between water and metal particulates. Direct contact can be avoided by coating the metal particulates with an impervious non-reacting material. The coating may be applied before addition of metal to the castable refractory composition or in-situ during preparation of the castable refractory composition.

The refractory castable composition may further comprise up to about 1.0% by weight of organic fibres, based on the total dry weight of the castable refractory composition. The organic fibres may improve the strength of the composition during setting and drying and suppress or eliminate the appearance of cracks on drying. The organic fibres are eliminated during the firing of the refractory, which leads to the creation of a network of small capillaries which may enhance the evacuation of water. In an embodiment, the refractory castable composition comprises up to about 0.8% by weight of organic fibres, for example, up to about 0.5% by weight, for example up to about 0.3% by weight, for example up to about 0.2% by weight or, for example up to about 0.1% by weight of organic fibres. In other embodiments, the castable refractory composition comprises less than about 0.1% by weight of organic fibres, for example, less than about 0.05% by weight of organic fibres. Organic fibres include polypropylene, polyacrylonitrile or polyvinyl-alcohol fibres, natural fibres derived from any suitable source, such as coconuts, wood, grasses (e.g., sugarcane, bamboo) textile waste, cotton, hemp, flax or linen, and combinations thereof. As noted below, in one embodiment, the castable refractory composition is substantially free of organic fibres.

As used herein, the term "substantially free" refers to the total absence of or near total absence of a specific compound or composition. For example, when a composition is said to be substantially free of zirconia, there is either no zirconia in the composition or only trace amounts of zirconia in the composition. A person skilled in the art will understand that a trace amount is an amount which may be detectable but not quantifiable and moreover, if present, would not adversely affect the properties of the castable refractory composition or article formed therefrom.

Thus, in further embodiments, the refractory composition is substantially free of one or more of the following species:
(a) zirconia;
(b) zircon sand (zircon silicate)
(c) pitch;
(d) tar;
(e) hydraulically setting reactive alumina substantially free of calcium oxide, known as "hydratable alumina" or ρ-alumina;
(f) spinel, prior to casting the refractory;
(g) andalousite;
(h) metallic additives, which in the presence of water are capable of hydrolysing to form hydrogen gas; for example, aluminium, silicon, magnesium and magnesium alloys; and
(i) organic fibres (as described above).

In further embodiments, the present invention does not utilise, rely upon or involve one or more of the following bonding systems:
(j) colloidal alumina suspensions and/or colloidal silica suspensions used as liquid addition for preparation of an installable product, permitting the stiffening and setting of the castable mixture once installed by destabilisation of the colloidal dispersion and gellification;
(k) acids such as phosphoric acid which react with oxides or hydroxides such as magnesia and alumina or other impurities leading to cross reticulation;
(l) sodium silicate, reacting either with acids (causing setting by gellification of hydroxysilicates), salts (increasing viscosity of silicate solution and gel formation) or alkaline earth metal hydroxides (causing coagulation);
(m) aluminium phosphates hardening at a temperature greater than 100° C. or reacting at lower temperature with oxides such as magnesia forming a bond by creation of a Mg and/or P hydrates network;
(n) polysaccharide-based water soluble polymers;
(o) species which would cause the reticulation, polymerization or co-polymerization of organic components, when present, which are capable of being reticulated, polymerized or co-polymerized in the presence of said species; and
(p) hydration of a reactive alumina substantially free of calcium oxides known as hydratable alumina or ρ-alumina.

In accordance with the second aspect stated above, the present invention is directed to an installable refractory lining obtained by mixing the castable refractory composition described above in accordance with the first aspect with 2% to 40% by weight water. By "installable" is meant that the refractory lining is of a form which is capable of being installed by any of the methods described below.

In accordance with the third aspect stated above, the present invention is directed to a method of installing the installable refractory lining of the second aspect of the present invention using a technique selected from casting, self flowing, shotcreting, rodding, cast-vibrating, spraying, conventional dry gunning or high density gunning, followed by setting and drying. These techniques are well known to persons of ordinary skill in the art.

In accordance with the second and third aspects of the present invention, the amount of casting water mixed with the castable refractory composition will vary depending on the precise composition of the castable refractory composition, its intended use and the method by which the refractory is to be installed.

For example, when the refractory is to be installed using a conventional dry gunning technique, between about 10% and 40% by weight of water is added to the castable refractory composition.

For example, when the refractory is to be installed using a casting or spray-casting technique, between about 2 and 8 wt. % by water is added to the castable refractory composition.

For example, when the refractory is to be installed using a high density gunning technique, between about 5 and about 20 wt. % water is added to the castable refractory composition.

In embodiments, the castable refractory composition is mixed with about 2-30% by weight of water, for example about 2-20% by weight of water, for example about 2-10% by weight of water, for example about 5-30% by weight of water, for example about 10-30% by weight of water, for example about 2-20% by weight of water, for example about 5-20% by weight of water, for example about 10-20% by weight of water, for example about 2-10% by weight of water or, for example about 3-7% by weight of water, based on the total dry weight of the castable refractory composition.

To achieve suitable wetting of the dry castable refractory composition for installation by casting, rodding, cast-vibrating, self-flowing or shotcreting, mixing times range from about 30 seconds to about 10 mins, for example, from about 30 seconds to about 5 mins or for example from about 30 seconds to about 2 mins. Suitable mixing apparatus are well known to persons of ordinary skill in the art.

In an embodiment, the setting step, during which the mixture hardens, includes reaction of alkaline earth metal oxide and/or hydroxide, silica having a surface area of at least 10 $m^2/g$ (for example, silica fume) and water, without the need for firing.

Setting times range from about 1 hour to about 10 hours, for example, from about 2 hours to 8 hours, for example, from about 3 hours to 7 hours, for example, from about 4 hours to 6 hours or, for example, from about 4 hours to 5 hours.

As described above, the mixture of castable refractory composition and water may release less than about 25 $cm^3$ of hydrogen gas per kilogram of the mixture, for example, less than about 15 $cm^3$ $H_2$/kg of the mixture or, for example, less than about 10 $cm^3$ $H_2$/kg of the mixture. In an embodiment, hydrogen emission is not detectable by the measurement procedure described herein.

Drying, to reduce or eliminate residual water, is conducted in accordance with conventional procedures, as will be readily apparent to a person of ordinary skill in the art. Typically, drying is conducted in air at a temperature between about ambient e.g., about 20° C.) and 800° C. during installation.

Firing, i.e. heating the mixture at elevated temperature to produce a ceramic/oxide bond, may be conducted at a temperature greater than about 800° C., for example, equal to or greater than about 900° C., for example, equal to or greater than about 1000° C., for example, equal to or greater than about 1100° C., or example, equal to or greater than about 1200° C., for example, equal to or greater than about 1300° C., for example, equal to or greater than about 1400° C., for example, equal to or greater than about 1500° C. or, for example, equal to or greater than about 1600° C.

The viscosity of the mixture of castable refractory composition and water may be adjusted by using the soluble powdered organic or soluble mineral additives described above. Such additives, known as dispersing agents, serve to modify particulate surface properties either by direct adsorption on the particulate surface or by modification of water suspension ionic composition.

The mixture, if dedicated to placement by casting, cast-vibration, rodding, self-flowing or shotcreeting, after mixing may have a flow from about 50 to 200%, as determined in accordance with EN 1402. In an embodiment, the mixture has a flow from about 100 to 200%, for example, from about 100 to 150%. Thus, in another embodiment, the flow of the mixture after mixing may be adjusted using the soluble powdered organic or soluble mineral additives described above.

The present invention is also directed to an installed factory lining obtainable by the method of the third aspect of the present invention. The lining may be a lining for cupolas hearth and siphon, blast furnaces, main, secondary and tilting runners, vessels or vessel spouts, ladles, tundishes, reaction chambers and troughs that contain, direct the flow or are suitable to facilitate the industrial treatment of liquid metals and slags, or any other high temperature liquids, solids or gases.

In accordance with the fourth aspect stated above, the present invention is directed to a method of installing a refractory comprising: mixing the castable refractory composition according to first aspect of the invention with water, forming the mixture into an article, allowing the article to set, drying the article to remove excess water, and optionally firing the article at an elevated temperature, as described above.

As described above, the setting step includes reaction of alkaline earth metal oxide and/or hydroxide, silica having a surface area of at least 10 $m^2/g$ (for example, silica fume) and water, without the need for firing.

In accordance with the sixth aspect stated above, the present invention is directed to a refractory article obtainable by the method of the fifth aspect of the present invention. The refractory articles formed from the castable refractory composition are many and various and include, for example, pre-shaped articles, in whole or part, such as refractory bricks and crucibles.

For the avoidance of doubt, the present application is directed to the subject-matter described in the following numbered paragraphs:

1. A castable refractory composition comprising:
   5% to 95% by weight of alumina, aluminosilicate, or mixtures thereof,
   optionally up to 70% by weight silicon carbide,
   optionally up to 10% by weight carbon,
   0.1% to 5% by weight alkaline earth metal oxide and/or hydroxide, and
   0.1% to 5% by weight of silica having a surface area of at least about 10 m2/g;
   wherein the refractory composition includes no more than 0.5% by weight of cementitious binder;
   wherein the refractory composition does not release a significant amount of hydrogen gas upon addition of water; and
   wherein the refractory compositions sets on addition of water.

2. A castable refractory composition according to paragraph 1, further comprising 0.01% to 3% by weight solid powdered organic additives.

3. A castable refractory composition according to paragraph 1 or paragraph 2, further comprising 0.01% to 3% by weight soluble mineral additives.

4. A castable refractory composition according to any of the preceding numbered paragraphs further comprising up to about 1% by weight of metallic additives.

5. A castable refractory composition according to any of the preceding numbered paragraphs, further comprising up to about 5% by weight of an additive or combination of additives which suppress or prevent the oxidation of carbon.

6. A castable refractory composition according to any of the preceding numbered paragraphs, further comprising up to 0.5% by weight of organic fibers.

7. A castable refractory composition according to any of the preceding numbered paragraphs, wherein the alumina, aluminosilicate or mixture thereof comprises a material selected from the group consisting of brown fused alumina, sintered alumina, white fused alumina, calcined alumina, reactive or semi-reactive alumina, bauxite, fused or sintered mullite, andalusite and calcined chamotte with alumina content of 30 to 75% by weight.

8. A castable refractory composition according to any of the preceding numbered paragraphs, comprising 5% to 70% by weight silicon carbide and/or 1% to 10% carbon.

9. A castable refractory composition according to any of the preceding numbered paragraphs, wherein the silicon carbide comprises particles up to about 30 mm in size.

10. A castable refractory composition according to any of the preceding numbered paragraphs, wherein the carbon comprises a material selected from carbon black, graphite, coke, solid hydrocarbon having a carbon residue of at least about 5% by weight after coking, or a combination thereof.

11. A castable refractory composition according to any of the preceding numbered paragraphs, wherein the silica having a surface of at least about 10 m2/g is selected from the group consisting of fumed silica, silica fume, microsilica, micro grinded silica and precipitated silica.

12. A castable refractory composition according to any of the preceding numbered paragraphs, wherein the alkaline earth metal oxide and/or hydroxide is an oxide and/or hydroxide of magnesium, calcium, barium or mixtures thereof.

13. A castable refractory composition according to any of the preceding numbered paragraphs, wherein the composition comprise less than about 0.5% by weight calcium aluminate cement and/or calcium silicate cement.

14. A castable refractory composition according to any of the preceding numbered paragraphs, wherein the refractory composition is substantially free of zirconia.

15. A castable refractory composition according to any of the preceding numbered paragraphs, wherein the composition is substantially free of spinel prior to casting the refractory.

16. A castable refractory composition according to any of the preceding numbered paragraphs, wherein the composition is substantially free of metallic additives.

17. A castable refractory composition according to any of the preceding numbered paragraphs, wherein the composition is substantially free of organic fibres.

18. An installable refractory lining obtained by mixing the castable refractory composition according to any of the preceding numbered paragraphs with 2% to 40% by weight water.

19. A method of installing the installable refractory lining of paragraph 18 using a technique selected from casting, self-flowing, wet shotcreeting, rodding, cast-vibrating, spraying, conventional dry gunning or high density gunning, followed by setting and drying.

20. The method of paragraph 19, wherein the setting step includes reaction of alkaline earth metal oxide and/or hydroxide, silica having a surface area of at least 10 m²/g and water, without the need for firing.

21. The method of paragraph 20, wherein the mixture releases less than 10 cm³ of hydrogen gas per kg of wet castable refractory.

22. An installed factory lining obtainable by the method of any one of paragraphs 19-21.

23. A method of installing a refractory comprising: mixing the castable refractory composition according to any one of paragraphs 1-17 with water, forming the mixture into an article, allowing the article to set, drying the article to remove excess water, and optionally firing the article.

24. A refractory article obtainable by the method of paragraph 23.

The invention will now be illustrated, by reference to the following non-limiting examples.

EXAMPLES

Example 1

Four castables (A, B, C and D) were formulated and mixed with water. Compositions data is summarized in Table 1. These mixtures are suitable for use as refractory lining for cupolas hearth and siphon, blast furnaces main, secondary and tilting runners, vessels or vessel spouts, troughs that direct the flow of liquid metals and slags, or any application calling for thick refractory linings and/or hot installation of linings and/or safe and quick dry-out and heating up.

The first mixture (A) is a typical ultra-low cement castable containing aluminium and silicon metal powder and, thus, generates hydrogen when mixed with water. The second mixture (B) is the same as mixture A, save that aluminium and silicon have been removed, and polypropylene fibres added. This is an example of a cement based, non-hydrogen releasing castable. The third and fourth mixtures (C & D) are cement-free and non-hydrogen releasing castables prepared in accordance with the present invention.

The dispersion and setting time modification solid powdered organic and soluble mineral additions were adjusted to provide similar flow and setting time, as given in Table 2, for both bonding systems used.

TABLE 1

| Weight % composition | Mixture A | Mixture B | Mixture C | Mixture D |
|---|---|---|---|---|
| Brown fused alumina (0 to 6 mm) | 56 | 56 | 56 | 56 |
| Silicon Carbide (0 to 2 mm) | 25 | 25 | 25 | 25 |
| Carbon black | 1.1 | 1.1 | 1.1 | 1.1 |
| Solid hydrocarbon | 1.5 | 1.5 | 1.5 | 1.5 |
| Calcined and reactive alumina | 11.45 | 12.7 | 13.3 | 13.3 |
| 70% $Al_2O_3$ calcium aluminates cement | 1.5 | 1.5 | none | none |
| Silica fume | 2 | 2 | 2 | 2 |
| Aluminium powder | 0.3 | none | none | none |
| Silicon powder | 1 | none | none | none |
| solid powdered organic and soluble mineral additives | 0.15 | 0.15 | 0.25 | 0.25 |
| $Ca(OH)_2$ | 0 | 0 | 0.8 | 0 |
| MgO | 0 | 0 | 0 | 0.8 |
| Polypropylene fibres | none | 0.05 | 0.05 | 0.05 |
| Total of dry components | 100 | 100 | 100 | 100 |
| Casting water added | 4.5 | 4.5 | 4.5 | 4.5 |

Figure 2:
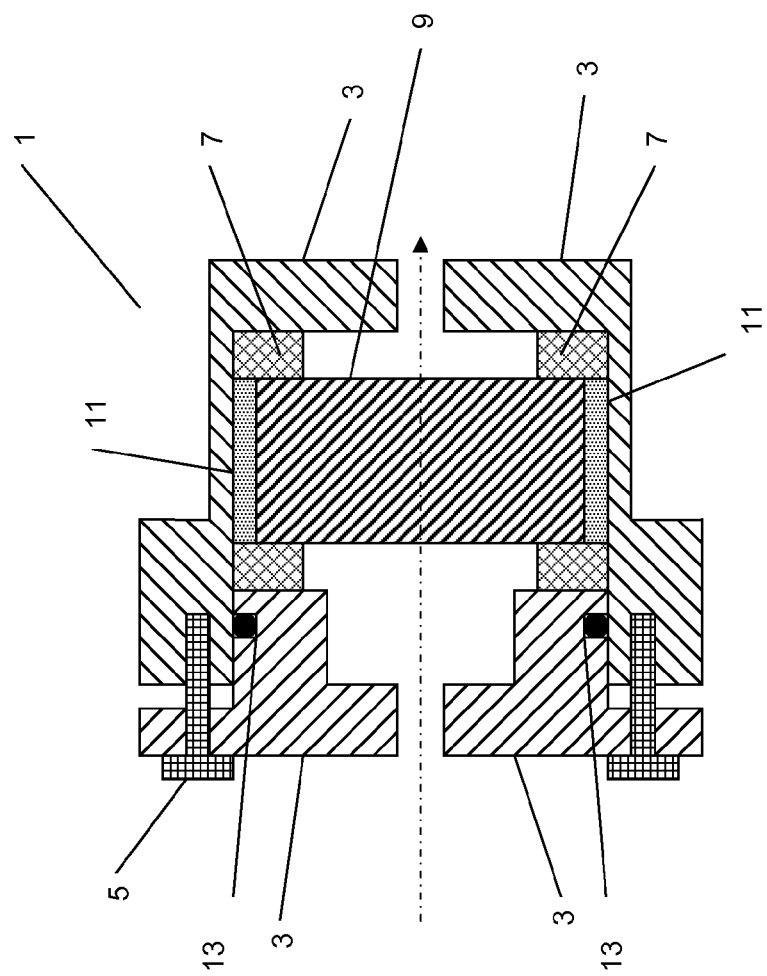
FIG. 2 is a schematic depiction of a cross-section through an assembly for measuring gas permeability of cast samples.

Gas permeability was measured on samples cored out of larger casted pieces preliminary treated at the temperatures give in Table 2, both in parallel and perpendicular direction compared to the casting direction. The procedure described in the European standard (EN 993-4) nor the one described in the American standard (ASTM C577) are not suitable for the measurement of the permeability of refractory castables, unless the castables are fired and have a permeability higher than $0.05 \times 10^{-13} m^2$. Therefore, the following procedure was used. Assemblies were derived from those used for civil engineering concretes. The developed set up (FIG. 2) is rather similar. FIG. 2 is a cross-section through the assembly. The assembly (1) comprises sample support members (3) which are held together by suitable fixing means (5), e.g., a pair of bolts. Axial flat rubber rings (7), pressed at 10 N.m over the ground surfaces of the cylindrical sample (9) leave a flow section having a diameter of 45 mm. The sample is coated with polyester resin (11) prior to testing. The assembly further comprises rubber O-rings (13). Four capillary flow-meters (not shown) were used to measure the very small flow going through the castables samples (9), with measurement ranges from 0.1 to 100 cm³/min. Rotameters (not shown) were used for higher flow rates.

The flow rate of a mixture of nitrogen and oxygen (80% $N_2$-20% $O_2$) was measured in the steady state for different pressure drops (input pressure between 0.25 and 0.6 MPa, output pressure 0.1 MPa, thickness of the sample 30 mm) to check for the flow regime (slip flow, viscous flow or visco-inertial flow). The direction of flow of gas mixture through the assembly and castable sample is indicated in FIG. 2 by the dashed arrow. The relationship between the pressure drop and the measured flow rates was first checked to verify that it can be considered as linear (→viscous flow regime). A permeability value may thus be calculated from the slope according to the Darcy law. These Darcian permeability values are the ones given in Table 2.

Hydrogen evolution was measured in accordance with the method described above.

The two formulations based on ultra low cement bond (A & B) and formulations C & D, illustrating the present invention, exhibit similar wetting time, flow and setting time. This illustrates the capability of the compositions of the present invention to be mixed and installed by the cast-vibration method using same equipment, same procedures and with same easiness as ultra low cement bond formulations.

Formulation A, due to the increase of pH resulting from calcium aluminates cement dissolution, exhibits hydrogen emission resulting from a hydrolysis reaction between the metal powders and water. Formulations B, C and D which do not contain metal powder, do not release detectable amounts of hydrogen.

In formulation A, the release of hydrogen during setting produces pores, voids and micro-cracking. As explained above, this well-known mechanism serves to increase permeability to gas and, thus, facilitates quick water dry-out during the heating up phase or safe installation on hot substrates.

In formulation B, illustrating an ultra low cement castable where permeability is enhanced by the percolated capillary network resulting from polypropylene fibres

TABLE 2

|  | Mixture A | Mixture B | Mixture C | Mixture D |
|---|---|---|---|---|
| Mixing time needed for achieving wetting of dry mixture [min:s] | 1:10 | 1:05 | 1:15 | 1:10 |
| Flow after mixing (as per EN 1402) [%] | 138 | 143 | 136 | 139 |
| Setting time [h:min] | 4:30 | 4:40 | 4:30 | 4:20 |
| Cumulative Gas (hydrogen) emission 72 hours after casting [$cm^3$/kg of castable] | 3200 | Not measurable (<10) | Not measurable (<10) | Not measurable (<10) |
| Modulus of rupture after drying at 110° C. (as per EN 1402) [Mpa] | 5.3 | 3.5 | 5.6 | 6.5 |
| Cold crushing strength after drying at 110° C. (as per EN 1402) [Mpa] | 33 | 15 | 39 | 47 |
| Modulus of rupture after after treatment at 200° C. (as per EN 1402) [Mpa] | 4.7 | 3.4 | 6.2 | 7.5 |
| Cold crushing strength after treatment at 200° C. (as per EN 1402) [Mpa] | 33 | 19 | 43 | 51 |
| Gas (air) permeability in direction parallel to casting direction after drying at 110° C. [$\times 10^{-16}\,m^2$] | 4.5 | 2.6 | 15.2 | 14.7 |
| Gas (air) permeability in direction perpendicular to casting direction after drying at 110° C. [$\times 10^{-16}\,m^2$] | 8.8 | 2.7 | 290 | 340 |
| Gas (air) permeability in direction parallel to casting direction after drying at 200° C. [$\times 10^{-16}\,m^2$] | 7.3 | 28.3 | 39.6 | 42.5 |
| Gas (air) permeability in direction perpendicular to casting direction after drying at 200° C. [$\times 10^{-16}\,m^2$] | 10.6 | 26.5 | 468 | 551 | burnout, it is visible that (1) permeability after treatment at 110° C. is significantly lower than for castable A, and (2) permeability increases only after melting of the fibres. Even if the permeability of formulation B can be increased by melting the fibres, the resulting increase in permeability occurs at a temperature (>160° C.) at which most of the water contained in the castable has already turned into vapour and, thus, too late to permit easy and safe water dry-out.

In formulations C and D, the bond system leads, surprisingly, to a particularly high gas permeability, even after treatment at 110° C., which illustrates the capability of the castable refractory composition to be quickly and safely dried out. Formulation C and D also exhibits higher mechanical strength than formulations A and B. This particular property, associated with the high gas permeability, will enable linings in accordance with the present invention to be dried out quicker with less risk of steam spalling or lining explosion. Further, the absence of hydrogen emission, makes the composition of the present invention safer to use compared to conventional ultra low based castables, especially in terms of decreased risk of explosion resulting either (1) from water vapour pressure generation inside lining during dry out (that could exceed the ultimate strength of the lining), or (2) from detonation of hydrogen emitted during setting when mixed with oxygen from air and submitted to accidental ignition source.

Example 2

Ten castables were formulated and mixed with water. Compositional data is summarized in Table 3. The dispersion and setting time modification organic and soluble mineral additions were adjusted to provide similar flow and setting time, as given in Table 4, for both bonding systems used.

In formulations 2, 3, 6 and 8 containing cement and metallic aluminium, the hydrolysis reaction takes place and leads to the generation of hydrogen. This hydrogen release during the setting step of the castable leads to an increase of the permeability to gas, which is a governing factor in the capability of the castable to be dried and heated up quick and safe. The phenomenon is the same in the two tested cement bonds (low cement and ultra low cement). The presence of polypropylene fibres in the cement bonded samples (mixtures n° 2 & 6) releasing hydrogen does not influence the gas permeability measured after treatment at 110° C. The presence of the same fibres in cement bonded castable not releasing hydrogen (mixtures n° 1 & 5) does not increase permeability to a level comparable to versions releasing hydrogen as the temperature of 110° C. is too low to achieve melting of the fibres and creation of an interconnected capillary network (which would be expected to lead to an increase in permeability). In both cement based bonds tested (low and ultra-low cement content) the presence of fibres does not therefore increase the capability of castables to be safely and quickly dried out.

Mixtures 9 and 10, illustrating the present invention, can be mixed and installed by cast-vibration method using same equipment, same procedures and with same easiness as the other cement based compositions. Mixtures 9 and 10 do not contain fibres nor release any gas during setting, but nevertheless exhibit a permeability of the same order of magnitude than hydrogen releasing mixtures. This property enables linings based on the invention to be dried out more quickly with less risk of steam spalling or lining explosion. This capability, associated with the absence of hydrogen emission, makes the castables of the present invention safer to use than conventional low or ultra low cement based castables.

TABLE 3

|  | Mixture 1 | Mixture 2 | Mixture 3 | Mixture 4 | Mixture 5 | Mixture 6 | Mixture 7 | Mixture 8 | Mixture 9 | Mixture 10 |
|---|---|---|---|---|---|---|---|---|---|---|
| Mixture description | | | | | | | | | | |
| Bond type | Low Cement | Low Cement | Low Cement | Low Cement | Ultra Low Cement | Ultra Low Cement | Ultra Low Cement | Ultra Low Cement | Present invention | Present invention |
| Drying fibres | y | y | n | n | y | y | n | n | N | N |
| Hydrogen release | n | y | y | n | n | y | n | y | N | N |
| Mixture weight composition [%] | | | | | | | | | | |
| 60% alumina chamotte 0 to 6 mm | 80 | 80 | 80 | 80 | 80 | 80 | 80 | 80 | 80 | 80 |
| Graphite | 1.5 | 1.5 | 1.5 | 1.5 | 1.5 | 1.5 | 1.5 | 1.5 | 1.5 | 1.5 |
| Carbon black | 1.5 | 1.5 | 1.5 | 1.5 | 1.5 | 1.5 | 1.5 | 1.5 | 1.5 | 1.5 |
| Calcined and reactive alumina | 7.29 | 6.89 | 6.94 | 7.34 | 13.79 | 13.39 | 13.84 | 13.44 | 13.45 | 13.45 |
| 70% $Al_2O_3$ calcium aluminates cement | 5 | 5 | 5 | 5 | 1.5 | 1.5 | 1.5 | 1.5 | 0 | 0 |
| Silica fume | 4.5 | 4.5 | 4.5 | 4.5 | 1.5 | 1.5 | 1.5 | 1.5 | 2 | 2 |
| Aluminium powder | 0 | 0.4 | 0.4 | 0 | 0 | 0.4 | 0 | 0.4 | 0 | 0 |
| Solid powdered organic and soluble mineral additives | 0.16 | 0.16 | 0.16 | 0.16 | 0.16 | 0.16 | 0.16 | 0.16 | 0.25 | 0.25 |
| Polypropylene fibres | 0.05 | 0.05 | 0 | 0 | 0.05 | 0.05 | 0 | 0 | 0 | 0 |
| $Ca(OH)_2$ | 0 | 0 | 0 | 0 | 0 | 0 | 0 | 0 | 1.3 | 0 |
| MgO | 0 | 0 | 0 | 0 | 0 | 0 | 0 | 0 | 0 | 1.3 |
| Casting water added | 6.1 | 6.1 | 6.1 | 6.1 | 6.1 | 6.1 | 6.1 | 6.1 | 6.1 | 6.1 |

TABLE 4

|  | Mixture 1 | Mixture 2 | Mixture 3 | Mixture 4 | Mixture 5 | Mixture 6 | Mixture 7 | Mixture 8 | Mixture 9 | Mixture 10 |
|---|---|---|---|---|---|---|---|---|---|---|
| Flow after mixing (as per EN 1402) [%] | 150 | 150 | 165 | 177 | 134 | 140 | 155 | 147 | 141 | 150 |
| Cumulative Gas (hydrogen) emission 72 hours after casting [$cm^3$/kg of castable] | Not measurable (<10) | 3420 | 3630 | Not measurable (<10) | Not measurable (<10) | 3160 | Not measurable (<10) | 3390 | Not measurable (<10) | Not measurable (<10) |
| Gas (air) permeability in direction parallel to casting direction after drying at 110° C. [$\times 10^{-16}\ m^2$] | 2.5 | 24.5 | 25.0 | 0.3 | 2.5 | 40.1 | 2.2 | 38.9 | 37.2 | 42.3 |

The invention claimed is:

1. A castable refractory composition comprising:
   from 5% to 95% by weight of alumina, aluminosilicate, or mixtures thereof;
   silicon carbide in an amount up to 70% by weight;
   carbon in an amount up to 10% by weight;
   from 0.1% to 5% by weight alkaline earth metal oxide and/or hydroxide; and
   from 0.1% to 5% by weight of silica having a surface area of at least about 10 $m^2$/g,
   wherein the refractory composition comprises no more than 0.5% by weight of cementitious binder,
   wherein the refractory composition releases less than 25 $cm^3$ of hydrogen gas per kilogram of wetted castable refractory composition, and
   wherein the refractory compositions sets on addition of water.

2. A castable refractory composition according to claim 1, further comprising up to about 1% by weight of metallic additives.

3. A castable refractory composition according to claim 1, further comprising up to about 5% by weight of an additive or combination of additives, which suppress or prevent the oxidation of carbon.

4. A castable refractory composition according to claim 1, further comprising up to 0.5% by weight of organic fibers.

5. A castable refractory composition according to claim 1, wherein the alumina, aluminosilicate or mixtures thereof comprise a material selected from the group consisting of brown fused alumina, sintered alumina, white fused alumina, calcined alumina, reactive or semi-reactive alumina, bauxite, fused or sintered mullite, andalusite and calcined chamotte with alumina content ranging from 30 to 75% by weight.

6. A castable refractory composition according to claim 1, comprising from 5% to 70% by weight silicon carbide and/or from 1% to 10% by weight carbon.

7. A castable refractory composition according to claim 1, wherein the silicon carbide comprises particles up to about 30 mm in size.

8. A castable refractory composition according to claim 1, wherein the carbon comprises a material selected from carbon black, graphite, coke, solid hydrocarbon having a carbon residue of at least about 5% by weight after coking, or a combination thereof.

9. A castable refractory composition according to claim 1, wherein the silica having a surface of at least about 10 m²/g is selected from the group consisting of fumed silica, silica fume, microsilica, micro grinded silica, and precipitated silica.

10. A castable refractory composition according to claim 1, wherein the alkaline earth metal oxide and/or hydroxide is an oxide and/or hydroxide of magnesium, calcium, barium, or mixtures thereof.

11. A castable refractory composition according to claim 1, wherein the composition comprise less than about 0.5% by weight calcium aluminate cement and/or calcium silicate cement.

12. An installable refractory lining obtained by mixing the castable refractory composition according to claim 1 with from 2% to 40% by weight water.

13. A method of installing the installable refractory lining of claim 12, the method comprising at least one of casting, self-flowing, wet shotcreeting, rodding, cast-vibrating, spraying, conventional dry gunning, or high density gunning the castable refractory composition; and setting and drying the castable refractory composition to form the refractory lining.

14. The method of claim 13, wherein the setting comprises reaction of the alkaline earth metal oxide and/or hydroxide, silica having a surface area of at least 10 m²/g, and water, without firing the castable refractory composition.

15. The method of claim 14, wherein the mixture releases less than 10 cm³ of hydrogen gas per kilogram of wet castable refractory.

16. An installed factory lining obtained by the method of claim 13.

17. A method of installing a refractory comprising:
mixing the castable refractory composition according to claim 1 with water;
forming the mixture into an article;
allowing the article to set; and
drying the article to remove excess water.

18. The method of claim 17, further comprising firing the article.

19. A refractory article obtained by the method of claim 17.

20. The castable refractory compound of claim 1, comprising silicon carbide in an amount between 15-40% by weight.

* * * * *